United States Patent [19]

Vanderlaan et al.

[11] Patent Number: 5,770,637
[45] Date of Patent: Jun. 23, 1998

[54] ANTI-BACTERIAL, UV ABSORBABLE, TINTED, METAL-CHELATING POLYMERS

[75] Inventors: Douglas G. Vanderlaan; Susan B. Orr, both of Jacksonville, Fla.

[73] Assignee: Johnson & Johnson Vision Products, Inc., Jacksonville, Fla.

[21] Appl. No.: 641,409

[22] Filed: May 1, 1996

[51] Int. Cl.$^6$ .............................. B05D 5/06; G02B 3/00; C08F 20/54; C08F 12/28
[52] U.S. Cl. ......................... 523/106; 524/555; 524/916; 526/306; 526/307; 351/160 M
[58] Field of Search ............................. 523/106; 524/555, 524/916; 526/307, 306; 351/160 H

[56] References Cited

U.S. PATENT DOCUMENTS

| | | | |
|---|---|---|---|
| 3,214,413 | 10/1965 | D'Alelio | 260/78 |
| 4,304,895 | 12/1981 | Loshaek | 526/313 |
| 4,361,689 | 11/1982 | Patel et al. | 526/264 |
| 4,450,262 | 5/1984 | Drake et al. | 526/234 |
| 4,528,311 | 7/1985 | Beard et al. | 524/91 |
| 4,530,963 | 7/1985 | DeVoe et al. | 525/54 |
| 4,863,964 | 9/1989 | Hedlund et al. | 514/575 |
| 4,889,664 | 12/1989 | Kindt-Larsen et al. | 264/2.6 |
| 5,514,732 | 5/1996 | Vanderlaan et al. | 523/106 |

FOREIGN PATENT DOCUMENTS

| | | | |
|---|---|---|---|
| 50 934 | 5/1982 | European Pat. Off. | C08F 226/06 |
| 263 605 | 4/1988 | European Pat. Off. | C07C 93/193 |
| 343 996 | 11/1989 | European Pat. Off. | C08F 246/00 |
| 2 347 403 | 4/1977 | France | C08J 7/12 |
| 2 664 986 | 1/1992 | France | G02B 1/00 |
| 61-66303 u | 6/1986 | Japan . | |
| 62-192816 p | 11/1987 | Japan . | |
| 93-364327 | 9/1992 | Japan | A61L 2/16 |
| 05255011 | 1/1993 | Japan . | |
| 5269181 | 1/1994 | Japan . | |
| 825 548 | 5/1981 | U.S.S.R. . | |
| WO 80/02840 | 12/1980 | WIPO . | |

OTHER PUBLICATIONS

"Acute Iron Poisioning—Rescue with Macromomolecular Chelators", Rapid Publication, John R. Mahoney, Jr., Philip E. Hallaway, Bo E Hedlund, John W. Eason, Oct. 1989.

"The Effect of Topical Antimicrobial Agents on the Production of Toxic Shock Syndrome Toxin–1" Microbial Pathogeni . . . , 1994, Valerie Edwards–Hones and H. A. Foster.

*Primary Examiner*—Andrew E. C. Merriam

[57] ABSTRACT

A soft contact lens which comprises a water-swollen gel of a polymer prepared by polymerizing one or more hydrophilic monomers such as 2-hydroxyethyl methacrylate, one or more cross-linking monomers, a monomer that contains metal-chelating functionality such as an aminopolycarboxylic acid that contains a polymerizable olefinic group, and an effective amount of iron to absorb UV light and/or an effective amount of copper to cause the lens to be tinted.

16 Claims, 3 Drawing Sheets

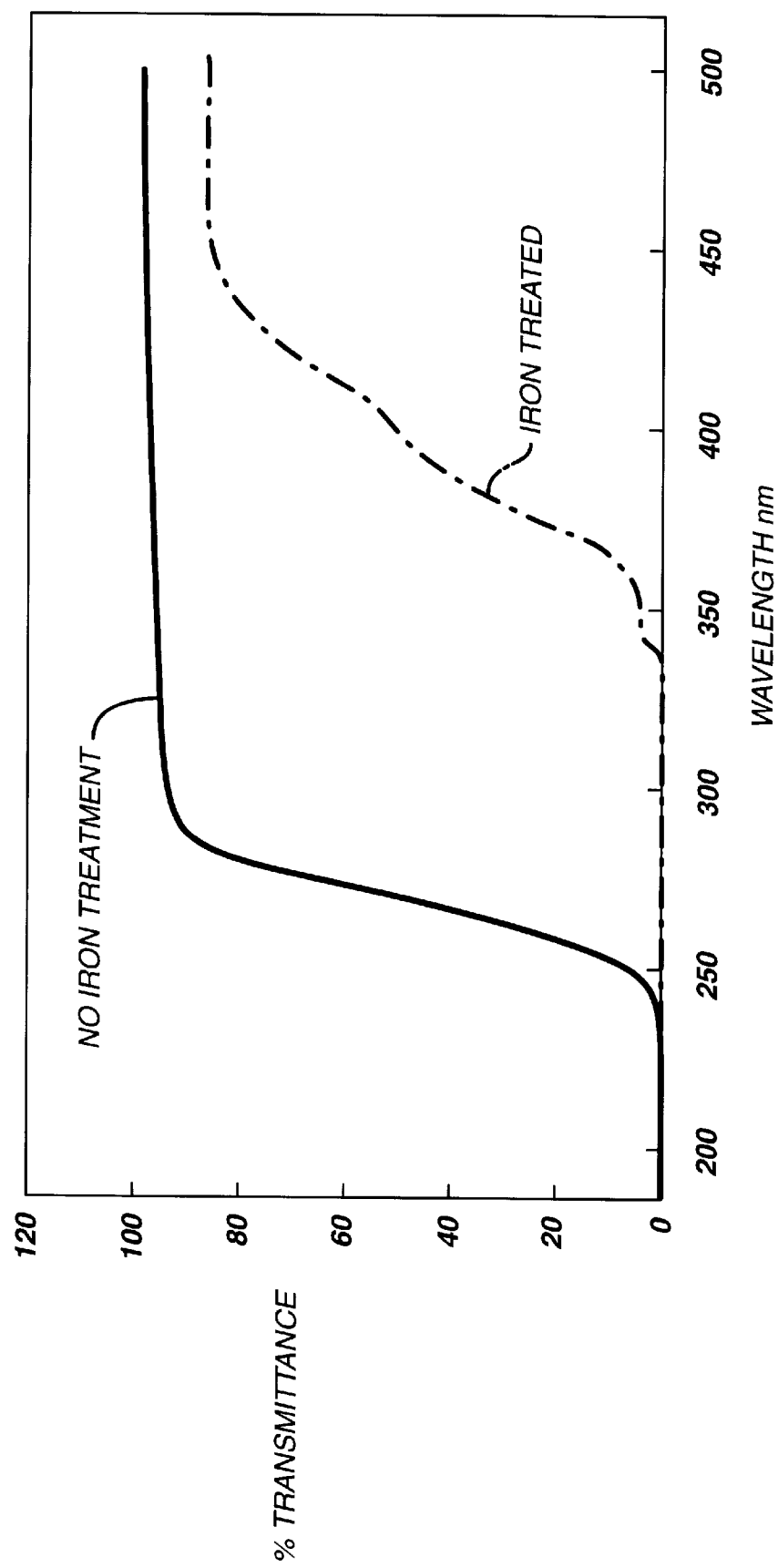

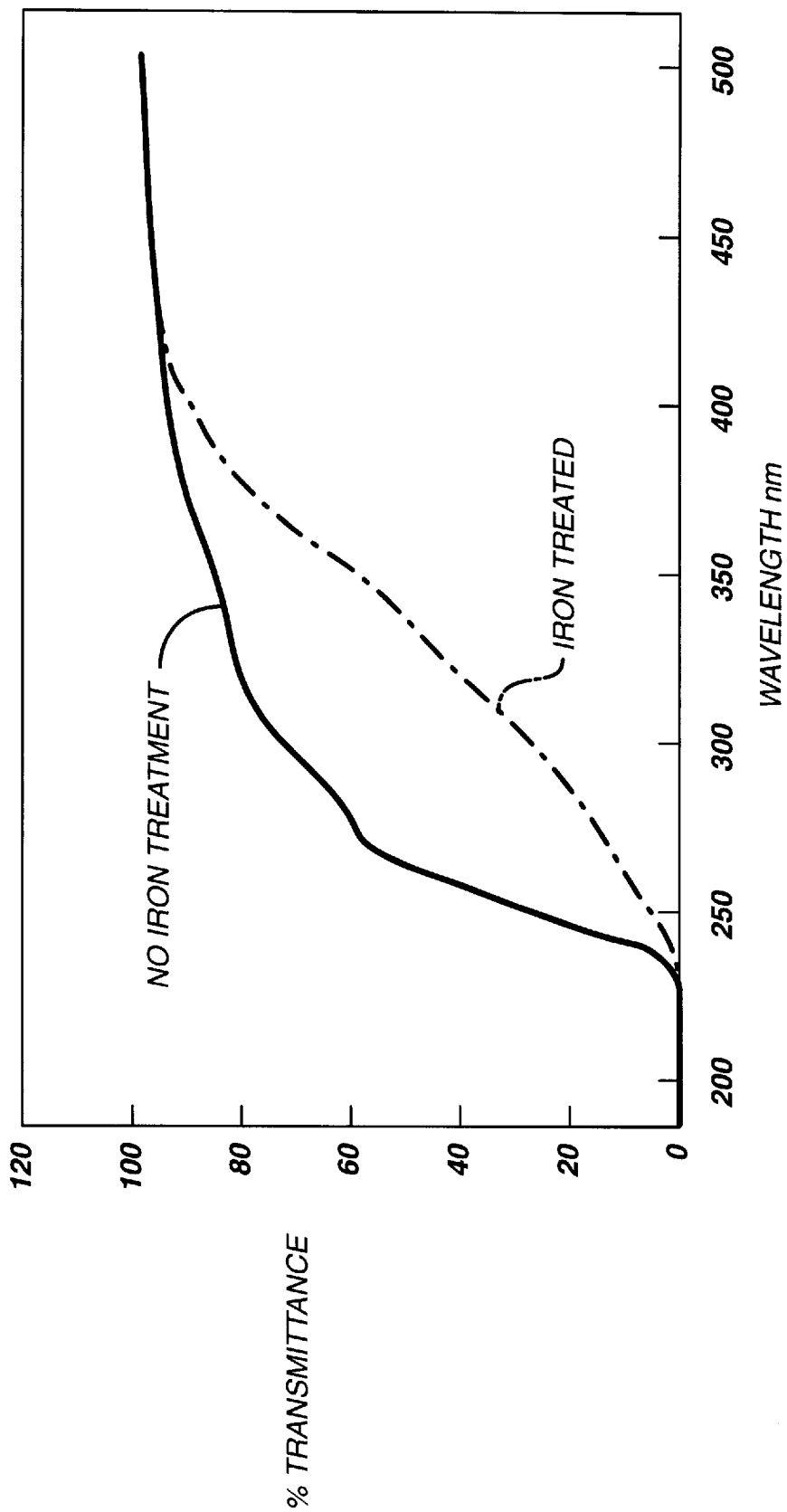

ANTI-BACTERIAL, UV ABSORBABLE, TINTED, METAL-CHELATING POLYMERS

CROSS-REFERENCE TO RELATED APPLICATION

This invention relates to the use of hydrogel polymers in ophthalmic lenses. Such lens can, typically, take the form of contact lenses or the form of intraocular lenses. Use of the term "contact lenses" is used throughout this specification to explain the invention. However, it should be noted, and it is well understood by those skilled in the art, that such polymers are interchangeably useful in either type of lens.

This invention relates to metal-chelating, hydrogel polymers which can be used in the fabrication of soft contact lenses. Careful selection of chelating capacity, optionally with incorporation of selected metals, can result in valuable special characteristics such as: antibacterial activity, UV absorptivity, and visibility enhancing tint. The invention also relates to a process for the preparation of soft contact lenses comprising said metal-chelating polymers and to a process for the preparation of the metal-chelating monomers that are employed in the production of said polymers.

BACKGROUND OF THE INVENTION

The most serious adverse response associated with the use of contact lenses is corneal ulceration. The risk of development of such ulcers is particularly associated with the use of soft lenses in an extended wear mode, that is, when the lens is worn continuously, without removal during sleep. Such ulcers can lead to perforation of the cornea, or can leave corneal scars which cause permanent partial vision loss. The most threatening ulcers are those caused by microbial agents such as Acanthamoeba or bacteria such as *Staphylococcus epidermidis, Staphylococcus aureus, Streptococcus pneumoniae* and *Pseudomonas aeruginosa*.

The healthy human eye uses a number of mechanisms to defend itself from infection by pathogenic bacteria. Lysozyme, one of the principal proteins found in tears, is known to kill common Gram positive bacteria by hydrolyzing and dissolving parts of their exterior membranes. Other proteinaceous tear components such as complement proteins and immunoglobulins such as secretory IgA contribute to this defense system. Lactoferrin is a tear protein which is bacteriostatic by virtue of its ability to bind iron and thus make it unavailable to bacteria. Bacteria cannot maintain sustained growth in the absence of iron. Also, other trace metallic elements such as calcium, copper, magnesium, molybdenum, and zinc are essential co-factors for many bacterial enzymes such as proteinases. In many cases, it is the action of such enzymes on tissue of the eye that causes much of the damage during a bacterial infection of the eye.

Another problem is that associated with the UV component of sunlight. Ultraviolet light is capable of causing damage to the retina and the natural crystalline lens, and it has been shown that UV light-absorbing contact lenses can provide protection against this damage ("Protection Against UVR Using the Vistakon UV/Bloc Soft Contact Lens," D. Pitts and M. Lattornai, Internationl Contact Lens Clinic, 1987, p. 22).

Previously described methods for making contact lenses which absorb UV light have generally consisted of copolymerizing a UV absorbing monomer into the lens polymer. For example, U.S. Pat. No. 4,528,311 describes the use of certain acryloxy benzotriazole monomers to make UV absorbing polymers.

One widely used process for making contact lenses is to place the appropriate monomers and optionally a diluent into a transparent mold and to irradiate with UV light to initiate polymerization. The process is rapid and can be conducted at room temperature. However, if a UV absorbing monomer is added to the monomer mixture then it is generally difficult or impossible to initiate polymerization with UV light, since the UV absorbing monomer prevents the photoinitiator from receiving the light necessary for it to function. It would, therefore, be useful to be able to incorporate a monomer which can be easily converted into a UV absorber after polymerization.

Still another problem associate with contact lenses is that associated with locating and identifying the surface that is to be placed against the eye. Typically, contact lenses are polymer materials that are clear and transparent. They are packaged in saline solution for shipment and storage prior to use and, upon opening the package, are nearly invisible in the package solution. Some manufacturers have taken to adding a dye to the lens material that gives the lens a slight tint so that the lens and the proper orientation of the lens can be easily identified.

BRIEF SUMMARY OF THE INVENTION

One aspect of this invention is based upon the discovery that soft contact lenses can be prepared from polymers that contain chelating functionality, and that such lenses have the ability to chelate metals such as, but not limited to, iron, calcium, copper, magnesium, molybdenum, and zinc, and thus make such metals unavailable to bacteria. Thus, this invention relates to a soft contact lens, which comprises a water-swollen gel of a polymer prepared by polymerizing one or more hydrophilic monomers, one or more cross-linking monomers, and a monomer that contains metal-chelating functionality.

A second aspect of this invention is the realization that ability of contact lenses made from these new metal chelating materials to absorb iron, coupled with the fact that such chelated iron effectively absorbs UV light, makes it possible to make such lenses that block UV light. Thus, this invention further relates to an ophthalmic lens which comprises a water-swollen gel of a polymer prepared by polymerizing one or more hydrophilic monomers, one or more cross-linking monomers, a monomer that contains metal-chelating functionality, and a UV absorbing amount of iron.

A third aspect of this invention is the discovery that when selected metals are chelated by the new lens, distinct but not detrimental lens colors may be formed. For example, addition of copper has been shown to give a lens with a blue color which is pleasing and could be useful in making the resulting contact lens easier to see when it is immersed in an aqueous solution. Thus, this invention further relates to an ophthalmic lens which comprises a water-swollen gel of a polymer prepared by polymerizing one or more hydrophilic monomers, one or more cross-linking monomers, a monomer that contains metal-chelating functionality, and an amount of a metal to impart a tint to the lens.

BRIEF DESCRIPTION OF THE FIGURES

FIG. 2 is a graph showing the transmittance of UV light through two lenses, one manufactured with chelated iron and one without.

FIG. 3 is a graph showing the transmittance of UV light through two lenses, one manufactured with chelated iron and one without.

DETAILED DESCRIPTION OF THE INVENTION

Figure 1:
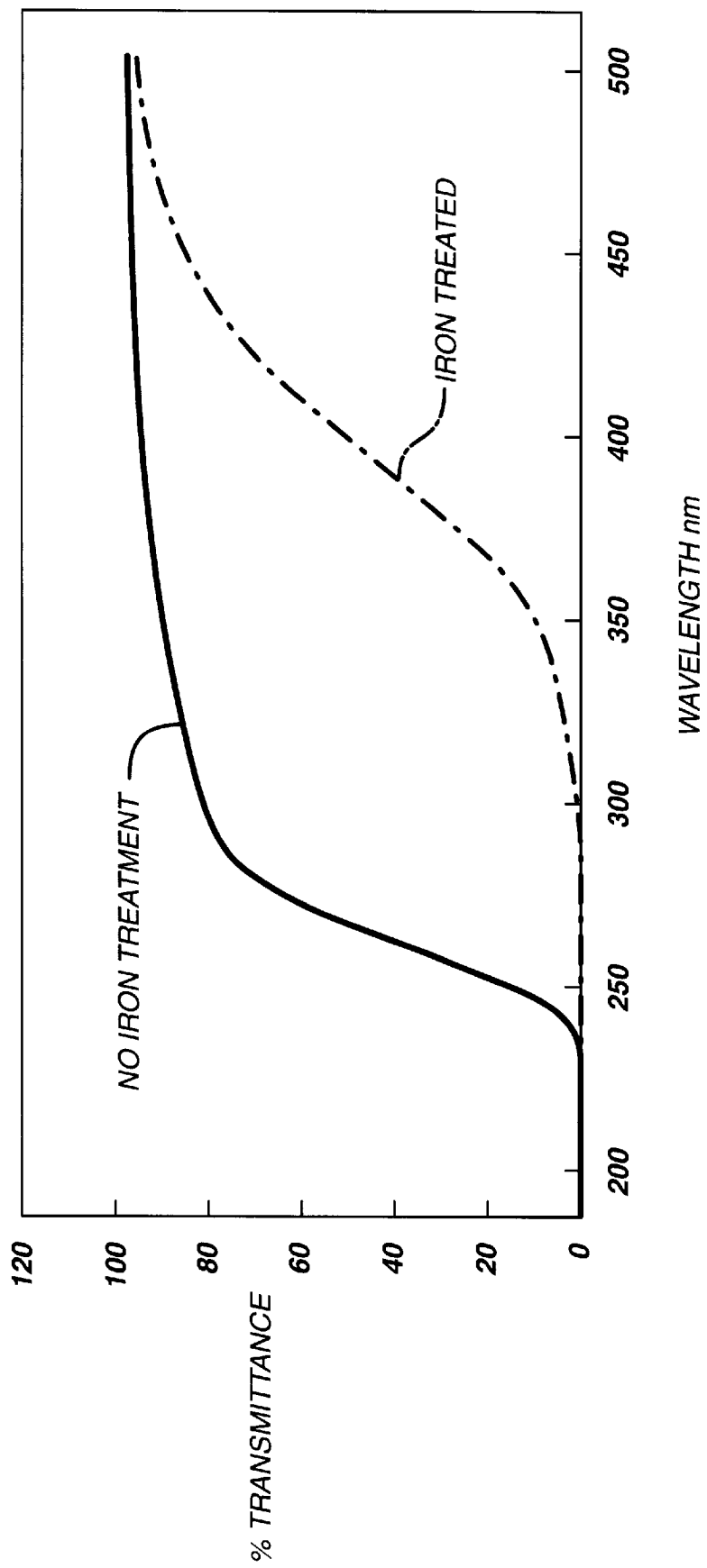
FIG. 1 is a graph showing the transmittance of UV light through two lenses, one manufactured with chelated iron and one without.

This invention is based upon the discovery that soft contact lenses can be prepared from polymers that contain metal chelating functionality, and that such lenses have the ability to chelate metals such as iron, calcium, copper, magnesium, molybdenum, and zinc, and thus make such metals unavailable to bacteria. Further, these metals, when chelated, will act to absorb ultraviolet light and will also impart a tint to the contact lens. The contact lenses of this invention comprise a water-swollen gel of a polymer prepared by polymerizing one or more hydrophilic monomers, one or more cross-linking monomers, and a monomer that contains metal-chelating functionality. Another aspect of this invention comprises the same contact lenses described above and additionally with a UV absorbing amount of iron. Still another aspect of this invention comprises the same contact lenses described above and additionally with enough metal to color-tint the lens.

Reactive Monomer

The reactive monomer mixture used in the invention contains a hydrophilic monomer such as 2-hydroxyethyl methacrylate ("HEMA") as the major component, one or more cross-linking monomers, optionally small amounts of other monomers such as methacrylic acid, and one or more monomers that contain metal-chelating functionality. HEMA is one preferred hydrophilic monomer. Other hydrophilic monomers that can be employed include 2-hydroxyethyl acrylate, 2-hydroxypropyl methacrylate, 2-hydroxypropyl acrylate, 3-hydroxypropyl methacrylate, N-vinyl pyrrolidone, glycerol mono-methacrylate, glycerol mono-acrylate, N,N-dimethylmethacrylamide, amino-alkyl carboxylic acids such as aminopropyl carboxylic acid, and the like.

Additional hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinyl benzoyl chloride, or the like, to produce a polyethylene polyol having one or more terminal polymerizable olefinic groups such as methacrylate groups or styryl groups bonded to the polyethylene polyol through linking moieties such as carbamate or ester groups.

In addition to HEMA and aminopropyl methacrylamide, other polymerizable compounds that can be reacted with a chelating agent to form a polymerizable monomer that includes chelating functionality include vinylbenzyl amine, allyl amine, hydroxyethyl acrylate, hydroxypropyl methacrylate, and the like.

Cross-Linking Monomer

The cross-linking monomers that can be employed, either singly or in combination, include ethylene glycol dimethacrylate ("EGDMA"), trimethylolpropane trimethacrylate ("TMPTMA"), glycerol trimethacrylate, polyethylene glycol dimethacrylate (wherein the polyethylene glycol has a molecular weight up to, e.g., about 5000), and other polyacrylate and polymethacrylate esters, such as the end-capped polyoxyethylene polyols described above containing two or more terminal methacrylate moieties. The cross-linking monomer can also be the monomer that contains chelating functionality, as is explained below. The cross-linking monomer is used in the usual amounts, e.g., from about 0.000415 to about 0.0156 mole per 100 grams of reactive monomer mixture.

Other monomers that can be used include methacrylic acid, which is used to influence the amount of water that the hydrogel will absorb at equilibrium. Methacrylic acid is usually employed in amounts of from about 0.2 to about 8 parts, by weight, per 100 parts of hydrophilic monomer. Other monomers that can be present in the polymerization mixture include methoxyethyl methacrylate, acrylic acid, ultra-violet absorbing monomers, and the like.

Catalyst

A polymerization catalyst is included in the monomer mixture. The polymerization catalyst can be a compound such as lauroyl peroxide, benzoyl peroxide, isopropyl percarbonate, azobisiso-butyronitrile, or the like, that generates free radicals at moderately elevated temperatures, or the polymerization catalyst can be a photoinitiator system such as an aromatic α-hydroxy ketone or a tertiary amine plus a diketone. Illustrative examples of photoinitiator systems are 2-hydroxy-2-methyl-1-phenyl-propan-1-one and a combination of camphorquinone and ethyl 4-(N,N-dimethylamino)benzoate. The catalyst is used in the polymerization reaction mixture in catalytically effective amounts, e.g., from about 0.1 to about 2 parts by weight per 100 parts of hydrophilic monomer such as HEMA.

Metal-Chelating Monomers

The major novelty in the invention resides in the use of a monomer that contains chelating functionality. We have found, for example, that certain metal chelating monomers, such as derivatives of the chelator EDTA, after being incorporated into a contact lens, can be treated with a polyvalent cation such as iron after lens formation to give a lens which absorbs UV light.

Typical chelating compounds include aminopolycarboxylic acids such as ethylenediamine tetraacetic acid ("EDTA"), diethylenetriamine pentaacetic acid ("DTPA"), diethylenetriamine tetraacetic acid, ethylene glycol bis(2-aminoethyl ether)-N,N,N',N'-tetraacetic acid, and the like. Such compounds can be reacted with a compound containing olefinic unsaturation to form a polymerizable monomer that contains metal-chelating functionality and which can be polymerized in the reactive monomer mixture used to prepare the hydrogel polymer of the invention. For example, EDTA dianhydride is reacted with aminopropylmethacrylamide (APMA), and the product is esterified with ethanol to produce the following polymerizable monomer:

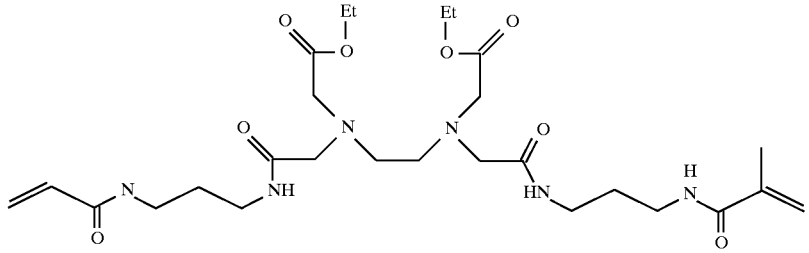

This monomer is UV-polymerized with HEMA in a contact lens mold and the resulting lens is heated in water (120° C.) to hydrolyze the ethyl ester groups, then treated with a solution of $Fe^{+2}$ or $Fe^{+3}$ to yield a lens which absorbs most UV light. Alternatively the above monomer can first be hydrolyzed to covert the ethyl ester groups to free acids, and then UV-polymerized with HEMA.

After copolymerization of the above monomer to form a hydrogel, and after hydrolysis and incorporation of iron, the following UV absorbing structure is incorporated into the lens polymer:

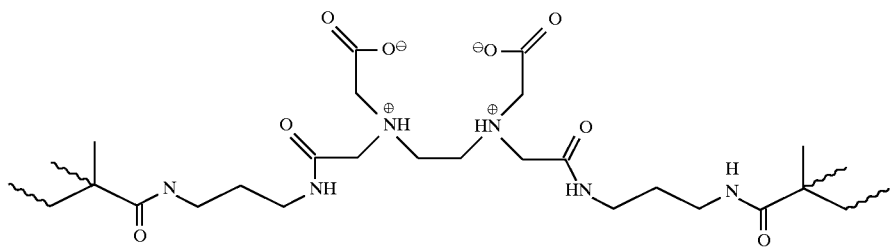

Lenses with metal-chelating functionality have anti-bacterial properties such as the ability to inhibit bacterial proteases.

In one aspect of the invention, the monomer that contains metal-chelating functionality is an ester of (a) an aminopolycarboxylic acid such as ethylenediamine tetraacetic acid, diethylenetriamine pentaacetic acid, diethylenetriamine tetraacetic acid, or ethylene glycol bis(2-aminoethyl ether)-N,N,N',N'-tetraacetic acid and (b) a hydroxyalkyl ester of (meth)acrylic acid, that is, acrylic or methacrylic acid, wherein the alkyl group has from 2 up to about 18 carbon atoms, and preferably from 2 to 6 carbon atoms.

In another aspect of the invention, the monomer that contains metal-chelating functionality is an amide of (a) an aminopolycarboxylic acid such as ethylenediamine tetraacetic acid, diethylenetriamine pentaacetic acid, diethylenetriamine tetraacetic acid, or ethylene glycol bis(2-aminoethyl ether)-N,N,N',N'-tetraacetic acid and (b) an aminoalkyl acrylamide or methacrylamide wherein the alkyl group has from 2 up to about 18 carbon atoms, and preferably from 2 to 6 carbon atoms. Since amides are usually more hydrolytically stable than esters, this aspect of the invention is preferred.

The monomer that contains metal-chelating functionality is employed in an amount such that the soft contact lens made from the reactive monomer mix containing the metal-chelating monomer is able to substantially reduce the essential trace metals present in the immediate surroundings in which the lens is present, either in storage or in place in the eye. Typical proportions are illustrated in the examples, below. As a general rule, the monomer that contains metal-chelating functionality is employed in a proportion of from about 0.01 to about 10 moles per 100 grams of reactive monomer mix.

To illustrate the preparation of such monomers that contains chelating functionality, the following two examples are provided:

EXAMPLE 1

1.50 grams DTPA anhydride was combined with 0.67 gram HEMA (mole ratio of HEMA:DTPA anhydride was about 5:4), 29.17 grams triethylamine ("TEA"), 8.33 grams acetonitrile and 12.50 grams DMSO (dimethylsulfoxide). The resulting clear, two-phase mixture was stirred at room temperature for one hour. The lower layer was evaporated at 50° C. and reduced pressure to give a yellow oil. The composition produced included the 1:1 adduct, which has the following formula in the non-ionized form:

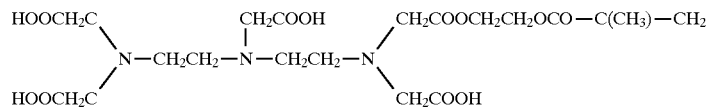

Some di-adduct was also expected to be produced, which can serve as the cross-linking monomer.

EXAMPLE 2

1.50 grams DTPA anhydride was combined with 0.67 gram aminopropyl methacrylamide hydrochloride ("APMA") (mole ratio of DPTA anhydride:APMA was about 4.2:3.7), 29.17 grams TEA, 8.33 grams acetonitrile and 12.50 grams DMSO. The resulting two-phase mixture was stirred at room temperature for one hour. The lower layer was evaporated at 50° C. and reduced pressure to give a viscous yellow oil. 5.0 ml water was added and the blend was evaporated again. 100 ml isopropyl alcohol was added and the resulting white solid was filtered and dried, yielding 1.63 grams of product which included the 1:1 adduct having the following formula in the non-ionized form:

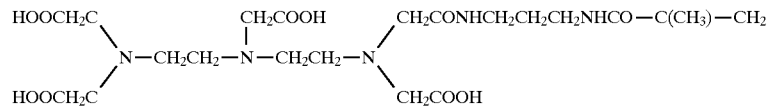

Some di-adduct was also expected to be produced, which can serve as the cross-linking monomer.

Manufacturing Process

The manufacturing process for the manufacture of contact lenses is taught, for example, in U.S. Pat. Nos. 4,889,664; 5,039,459; 5,080,839; and 5,435,943. Preferably, the hydrogel polymers of the invention are directly cast or molded in the shape of a contact lens by a process which comprises the steps of:

(1) molding or casting a polymerization mixture comprising:
   (a) a monomer mixture comprising a major proportion of one or more hydrophilic monomers such as 2-hydroxyethyl methacrylate, one or more cross-linking monomers, and a monomer that contains metal-chelating functionality; and
   (b) an inert, displaceable diluent, under conditions to polymerize said monomer mixture to produce a shaped gel of a copolymer of said monomers and said diluent; and
(2) thereafter replacing said diluent with water.

The diluents employed are ultimately water-displaceable. That is, the shaped gel of a copolymer of said monomers and said diluent is treated with a solvent to remove the diluent and ultimately replace it with water. In most cases, the solvent used to remove the inert diluent will be water (or an aqueous solution such as physiological saline). However, if desired, and depending on the solubility characteristics of the inert diluent used in the process of the invention, the solvent initially used to replace the inert diluent can be an organic liquid such as ethanol, methanol, acetone, glycerol, mixtures thereof, or the like, or a mixture of one or more such organic liquids with water, followed by extraction with pure water (or physiological saline) to produce a shaped gel comprising a copolymer of said monomers swollen with water.

Glycerol and boric acid esters of glycerol are the preferred inert, displaceable diluents for use in the invention.

The use of the monomers described in Examples 1 and 2 in the preparation of soft contact lenses is described in the following two examples:

EXAMPLE 3

0.40 gram of the oil from Example 1 is combined with 2.0 grams HEMA (2-hydroxyethyl methacrylate) [the HEMA also contains about 0.15 weight percent ethylene glycol dimethacrylate], 1.0 gram glycerin, 0.50 gram water and 0.03 gram DAROCUR 1173 ($\alpha$-hydroxy-$\alpha,\alpha$-dimethylacetophenone). This blend is filtered and cured in polystyrene contact lens molds by irradiation with UV light for 0.5 hour. The molds are opened and placed into borate buffered saline solution to release and hydrate the lenses.

EXAMPLE 4

0.5 gram of the product of EXAMPLE 2 were combined with 2.08 grams of HEMA (the HEMA also contained about 0.15 weight percent ethylene glycol dimethacrylate), 1.04 grams glycerin, 0.5 gram water and 0.03 gram DAROCUR 1173. The resulting blend was filtered and used to make lenses following the procedure of Example 3.

The lenses prepared in Examples 3 and 4 were tested for their ability to chelate iron, by the following procedure:

Method for Iron Analysis

Following the method of Skoog and West as described in "Fundamentals of Analytical Chemistry", (Third Edition) page 761 the following solutions were made:
Hydroxylamine—10 grams of $H_2NOH \cdot HCl$ in 100 ml water with sufficient sodium citrate added to bring the pH to 4.5.
Sodium citrate—250 g diluted with water to one liter.
o-Phenanthroline—0.3% in water.
81 ppm $Fe^{+2}$—0.400 gram of $FeSO_4 \cdot 7H_2O$ and 1 ml $H_2SO_4$ diluted with water to one liter.

The lenses were blotted to remove excess surface water and placed into vials with 100 $\mu$l of 81 ppm $Fe^{+2}$ solution and 900 $\mu$l water. These vials were shaken for 0.5 hour. 500 $\mu$l of the resulting sample solution was combined with 3.6 $\mu$l sodium citrate solution, 33.3 $\mu$l hydroxyethylamine solution and 100 $\mu$l of the o-phenanthroline solution. After five minutes this solution was diluted to 5.0 ml with water.

Control contact lenses made from a polymer produced from a reactive monomer mixture containing 96.8% by weight of HEMA, 1.97% methacrylic acid, 0.78% ethylene glycol dimethacrylate (EGDMA), 0.1% of trimethylolpropane trimethacrylate (TMPTMA) were similarly exposed to iron. Similarly, control solutions comprising only iron solution (and no lenses) were made. The absorbencies of each were measured at 508 nm and the results are shown in Table 1.

TABLE 1

|  | Absorbance @ 508 nm | Absorbance of Control Lens | Absorbance of Control Solution |
| --- | --- | --- | --- |
| Example 3 Lens | 0.008 | 0.187 | 0.236 |
| Example 4 Lens | 0.033 | 0.2 | 0.216 |

Thus, the lens produced in Example 3 removed 97% of the iron from the solution, and the lens produced in Example 4 removed 85% of the iron from the solution.

The following two examples similarly demonstrate the ability of contact lenses made from monomers containing metal-chelating agents to chelate metal, specifically iron.

EXAMPLE 5

0.2 gram of the oil from Example 1 was combined with 9.0 grams isopropyl alcohol. The blend was filtered and the resulting white solid dried to give 0.12 gram product. This product was used to make lenses by the following the procedure and using the reactive monomer mixture described in Example 3. The water content of these lenses (measured by refractive index following the method of Brennen, *International Contact Lens Clinic*, pp. 357–362, 1983) was 66.6% where:

$$\text{Water Content} = \frac{\text{mass of wet lens} - \text{mass of dry lens}}{\text{mass of wet lens}} \times 100\%$$

Iron chelation testing following the procedure described above is shown in Table 1 and demonstrates that 99% of the iron was removed from the solution.

EXAMPLE 6

Lenses from Example 3 were combined with 100 $\mu$l of 66 ppm $Fe^{+3}$ (0.16 grams $FeCl_3 \cdot 6H_2O$ and 1.0 gram $H_2SO_4$ in 500 ml water) and 900 $\mu$l water. After 30 minutes the resulting solution was analyzed for iron using the procedure described above. The results, shown in Table 1, demonstrate that 96% of the iron was removed from the solution.

The following example shows that elevated temperatures, such as those which subject extended wear contact lenses to cleaning, do not affect the ability of such polymers to absorb metals.

EXAMPLE 7

Two lenses from Example 4 were boiled for three hours in borate buffered saline solution, removing them at various intervals to measure their diameters. The results are shown in Table 2.

TABLE 2

| Time (hours) | Lens Diameter (mm) |
|---|---|
| 0.0 | 14.98, 14.90 |
| 0.5 | 14.94, 14.87 |
| 1.0 | 14.84, 14.79 |
| 2.0 | 14.80, 14.80 |
| 3.0 | 14.80, 14.80 |

Iron chelation testing following the procedure described above is shown in Table 3 and demonstrates that these lenses retained their iron chelating ability even after extended boiling.

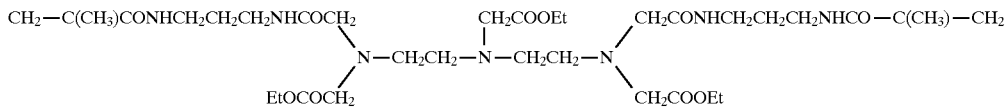

TABLE 3

| | Absorbance @ 508 nm | Absorbance of Control Lens | Absorbance of Control Solution |
|---|---|---|---|
| Example 5 Lens | 0.003 | | 0.227 |
| Example 6 Lens | 0.006 | 0.131 | 0.155 |
| Example 7 Lens | 0.035 | | 0.223 |

EXAMPLE 8

Lenses were made from a reactive monomer mixture containing 0.59 gram of a DPTA anhydride/APMA adduct prepared by the method of Example 2, 1.25 grams of HEMA, 0.03 gram of DAROCUR 1173, and 0.61 gram of glycerol, by the method described in Example 3. The water content of the resulting lens was 52.1±0.4%.

EXAMPLE 9

Lenses were made from a reactive monomer mixture containing 0.59 gram of a DPTA anhydride/APMA adduct prepared by the method of Example 2, 1.23 grams of HEMA, 0.02 gram methacrylic acid, 0.03 gram of DAROCUR 1173, and 0.61 gram of glycerol, by the method described in Example 3. The water content of the resulting lens was 57.8±0.6%.

EXAMPLE 10

0.10 Gram of APMA was added to a solution of 0.20 gram of DTPA anhydride and 0.20 gram of triethylamine in 27 grams of anhydrous ethanol. The solution cleared as it was heated to 75° C. After 30 minutes it was cooled to room temperature and several milliliters of 1.0M etherous HCl was added; pH paper was used to confirm that the solution was acidic. This solution was then heated to reflux for 8 hours. The solvent was removed at reduced pressure. 20 ml of saturated $NaHCO_3$ was added to the residue, and the product was extracted into $CH_2Cl_2$. TLC (silica gel plates, eluting with $CH_2Cl_2$ with a trace of $NH_4OH$) showed a major product in addition to DTPA pentaethylester. The product was isolated as an oil by evaporation of the solvent.

A small sample of this product was isolated from the product mixture by flash chromatography. $^1$H NMR ($CDCl_3$) 1.23 ppm (t, 9H, 7 Hz), 1.68 ppm (m, 4H), 1.96 ppm (s, 6H), 2.7–3.4 ppm (m, 26H), 4.12 ppm (q, 2H, 7 Hz), 4.14 ppm (q, 4H, 7 Hz), 5.29 ppm (m, 2H), 5.77 ppm (s, 2H), 7.03 ppm (br t, 2H), 7.97 ppm (br t). Its $^1$H NMR was consistent with the structure shown below, in which Et=ethyl:

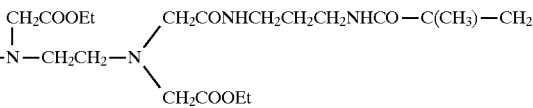

EXAMPLE 11

3.50 Gram of APMA was added to 5.00 grams of ethylenediaminetetraacetic dianhydride and 8.08 grams of triethylamine in 200 ml anhydrous ethanol. The mixture was heated at reflux for 2 hours. 1M etherous HCl was then added until the solution was acidic by pH paper. The solution was refluxed for 6 hours. 200 ml saturated $NaHCO_3$, 100 ml $H_2O$ and 200 ml of EtOAc (ethyl acetate) was added to the cooled solution. The EtOAc layer was washed two times with saturated NaCl and dried over $Na_2SO_4$. As the solvent was removed crystals formed. They were washed with fresh EtOAc and dried to yield 3.1 grams of white crystals, m.p.=124°–126° C. after recrystallization with EtOAc; $^1$H NMR ($CDCl_3$) 1.27 ppm (t, 6H, 7 Hz), 1.70 ppm (m, 4H), 1.98 ppm (s, 6H), 2.7–3.5 (m, 20 H), 4.17 ppm (q, 4H, 7 Hz), 5.32 (m, 2H), 5.77 ppm (s, 2H), 6.88 ppm (br s, 2H), 7.88 (br s, 2H); IR (neat) 3310, 2920, 1735, 1656, 1619, 1532, 1202, 1138, 1028, 929 cm$^{-1}$. This data is consistent with the structure shown below in which Et=ethyl:

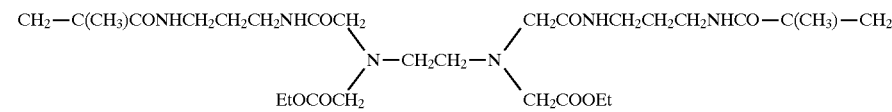

EXAMPLE 12

3.0 Grams of N-hydroxyethylethylenediamine triacetic acid was combined with 43 grams methanol and about 12 grams 1M HCl in ether and heated to reflux for six hours. The solvent was then evaporated and about 50 ml $NaHCO_3$ was added and the product was extracted into $CH_2Cl_2$. After evaporation of the solvent the product was recovered as 2.0 grams of colorless oil with a strong absorption at 1735 cm$^{-1}$.

This oil was combined with 0.71 grams methacryloyl chloride and 0.54 grams pyridine in 40 ml $CH_2Cl_2$. After stirring at room temperature for 24 hours this solution was extracted two times with saturated aqueous $NaHCO_3$ and dried over $Na_2SO_4$ to yield a straw colored oil after evaporation of solvent.

EXAMPLE 13

0.84 Gram of the oil from Example 10 was combined with 1.26 grams HEMA, 0.92 gram boric acid ester of glycerin (0.16 mole boron per mole glycerin) and 0.02 gram DAROCUR 1173. This blend was filtered and cured in polystyrene contact lens molds by irradiation with UV light for 0.5 hour. The molds were opened and placed into borate buffered saline solution to release and hydrate the lenses. The lenses were then heated in buffered saline in an autoclave at 120° C. for 7 hours. The diameter of the lenses before autoclaving was 11.9 mm. After autoclaving the diameter of the lenses was 15.2 mm.

Iron chelation testing following the procedure described above, except that the lens was combined with 300 µl $Fe^{+2}$ solution and 700 µl water, then shaken for 48 hours, after which the iron content of the resulting lens solution was analyzed:

| ABSORBANCE AT 508 nm | |
|---|---|
| No-Lens Control | Example 13 Lens |
| 0.735 | 0.034 |

Thus the Example 13 lens removed 95% of the iron from the solution.

EXAMPLE 14

Lenses were made from a blend of 0.04 gram of the crystalline product from Example 11 combined with 1.36 grams HEMA, 0.62 gram boric acid ester of glycerin (0.16 mole boron per mole glycerin) and 0.01 gram DAROCUR 1173. The lenses were then heated in buffered saline in an autoclave at 120° C. for 7 hours. The diameter of the lenses before autoclaving was 13.4 mm. After autoclaving the diameter of the lenses was 13.9 mm.

Iron chelation testing following the procedure described above, except that the lens was combined with 100 µl $Fe^{+2}$ solution and 900 µl water, then shaken for 24 hours, after which the iron content of the resulting lens solution was analyzed:

| ABSORBANCE AT 508 nm | |
|---|---|
| No-Lens Control | Example 13 Lens |
| 0.243 | 0.062 |

Thus the Example 14 lens removed 74% of the iron from the solution.

EXAMPLE 15

Lenses were made from a blend of 0.14 gram of the crystalline product from Example 11 combined with 1.26 grams HEMA, 0.62 gram boric acid ester of glycerin (0.16 mole boron per mole glycerin) and 0.01 gram DAROCUR 1173. The lenses were then heated in buffered saline in an autoclave at 120° C. for 7 hours. The diameter of the lenses before autoclaving was 13.2 mm. After autoclaving the diameter of the lenses was 14.8 mm.

Iron chelation testing following the procedure described above, except that the lens was combined with 100 µl $Fe^{+2}$ solution and 900 µl water, then shaken for 24 hours, after which the iron content of the resulting lens solution was analyzed:

| ABSORBANCE AT 508 nm | |
|---|---|
| No-Lens Control | Example 13 Lens |
| 0.243 | 0.008 |

Thus the Example 15 lens removed 97% of the iron from the solution.

EXAMPLE 15A

A lens having the composition according to Example 15 was combined with a 100 ppm solution of Copper(II) acetate monohydrate for eighteen hours. The lens was then rinsed in buffered saline and a UV scan was run. The resulting lens was tinted blue and showed a moderate absorbance with a maximum at 718 nm.

EXAMPLE 16

0.84 Gram of the oil from Example 12 was combined with 1.24 grams HEMA, 0.91 gram glycerin, 0.03 gram EGDMA (ethylene glycol dimethacrylate) and 0.02 gram DAROCUR 1173. This blend was filtered and cured in polystyrene contact lens molds by irradiation with UV light for 0.5 hour. The molds were opened and placed into borate buffered saline solution to release and hydrate the lenses. The lenses were then heated in buffered saline in an autoclave at 120° C. for 7 hours. The diameter of the lenses before autoclaving was 12.2 mm. After autoclaving the diameter of the lenses was 14.6 mm.

EXAMPLE 17

1.0 Gram of the crystalline product of Example 11 was combined with 12 grams of ethanol and 12 grams of water. 2.0% Aqueous NaOH was added until the pH of the solution reached 11. After 30 minutes 37% HCl was added dropwise to adjust the pH to 7. The solvent was evaporated and 10 grams methanol was added. The mixture was filtered and the resulting methanol solution was evaporated to give a white crystalline product.

EXAMPLE 18

Lenses were made by the procedure described above from 0.13 gram of the product from Example 17 combined with 1.27 grams HEMA, 0.64 gram boric acid ester of glycerin and 0.02 gram DAROCUR 1173.

Iron chelation testing following the procedure described above, except that the lens was combined with 300 µl $Fe^{+2}$ solution and 700 µl water, then shaken for 48 hours, after which the iron content of the resulting lens solution was analyzed:

| ABSORBANCE AT 508 nm | |
|---|---|
| No-Lens Control | Example 13 Lens |
| 0.752 | 0.105 |

Thus the Example 18 lens removed 86% of the iron from the solution.

EXAMPLE 19

A protease-producing strain of *Pseudomonas aeruginosa* was cultured in 10 ml of Meuller-Hinton broth with no supplementation and grown overnight at 37° C. at 230 rpm. The bacteria were removed from the culture by centrifugation. To 1.0 ml portions of this sterile broth (diluted 1/10) either (1) from one to three sterile contact lenses made with or without a metal chelating monomer (the lenses used were the polyHEMA control lens described above in Example 4 and the lenses described above in Examples 13 and 15), or (2) from 10 to 40 μM EDTA disodium salt, were added to the 1.0 ml portions and incubated with agitation at room temperature for 24 hours. The proteolytic activity was then measured using an azocasein assay as described in E. Kessler, H. E. Kennah, and S. I. Brown ("Pseudomonas protease. Purification, partial characterization and its effect on collagen, proteoglycan, and rabbit corneas." *Invest. Ophthalmology Visual Science* 1977; 16: 488–97). The results, displayed in the graph shown as FIG. 1, show that contact lenses made with these chelating monomers, like soluble EDTA, strongly inhibited *Pseudomonas aeruginosa* proteases. Notably, when 3 Example 15 lenses were used, no proteolytic activity at all was found.

EXAMPLE 20

4.74 Grams methacryloyl chloride was added in small increments to a stirring mixture of 3.50 grams hydroxylamine hydrochloride, 16.0 grams sodium carbonate and 40 ml ethanol cooled in an ice-water bath. The mixture was stirred for 48 hours, then rotovapped to give a white solid. This solid was extracted with isopropyl alcohol, which was then evaporated to give 5.42 grams of a semi-solid product. When this semi-solid was combined with ethyl acetate, white crystalline methacrylatohydroxamic acid separated, which was recovered by filtration and was rinsed with additional ethyl acetate. Methacrylatohydroxamic acid has the formula:

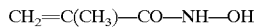

$CH_2=C(CH_3)-CO-NH-OH$

Contact lenses were made by the procedure described above from a blend of 0.75 gram of the boric acid ester of glycerin (0.16 mole boron per mole glycerin), 0.66 gram HEMA, 0.01 gram methacrylic acid, 0.01 gram ethylene glycol dimethacrylate, and 0.15 gram of methacrylatohydroxamic acid.

100 μl $Fe^{+2}$ solution and 900 μl water were combined with a lens of this Example 20 and shaken for 21 hours. Iron analysis of the resulting solution showed that 90% of the iron had been removed from the water.

Methacrylatohydroxamic acid is relatively hydrolytically unstable; therefore, lenses containing this monomer should not be heated in water for extended periods of time.

It may be desireable to use a chelating monomer with only one polymerizable group. This may, for instance, allow incorporation of chelating character while retaining a high degree of flexibility in the resulting polymer. Examples of such monomers include, but are not limited to, monoesters or monoamides of (a) ethylenediamine tetraacetic acid, diethylenetriamine pentaacetic acid, diethylenetriamenine tetraacetic acid, or ethylene glycol bis (2-aminoethyl ether)-N,N,N',N'-tetraacetic acid, and (b) an hydroxyalkyl ester of acrylic or methacrylic acid, or an aminoalkyl acrylamide or methacrylamide. Alternatively, methacylic or acrylic acid esters or amides containing an alkylamino-N,N-diacetic acid group, or diesters of the same may be used. Example 21 describes the preparation of aminopropylmethacrulamide-N,N-diacetic acid diethyl ester, a monomethacrylamide chelating monomer. Examples 22–23 describe the use of this monomer in the preparation of a chelating hydrogel.

EXAMPLE 21

2.01 g APMA HCl (3-aminopropylmethacrylamide hydrochloride), 3.73 ml ethyl bromoacetate and 3.56 g $Na_2CO_3$ were combined in 122 g acetonitrile and stirred at room temperature for 24 hours. The reaction mixture was filtered, a small crystal of hydroquinone monomethyl ether was added to the filtrate, and the solvent was evaporated under reduced pressure to give an orange liquid. Aqueous 4% HCl was added until the mixture was acidic. This solution was extracted once with $CH_2Cl_2$, made alkaline with saturated $Na_2CO_3$, and extracted again with fresh $CH_2Cl_2$. The $CH_2Cl_2$ layer was dried over solid $Na_2SO_4$, inhibited with a small crystal of HQMME, and rotovapped to give 1.64 g (50% yield) of product as an oil which gave the following analytical results: $^1H$ NMR ($CDCl_3$) 1.22 ppm (t,6H), 1.61 (m 2H), 1.92 (s, 3H), 2.71 (t, 2H), 3.41 (t, 2H), 3.44 (s, 4H), 4.12 (q, 4H), 5.25 (m, 1H), 5.71 (m, 1H), 7.39 (br s, 1H); IR (neat) 3354, 2980, 2938, 2870, 1737, 1661, 1619, 1619, 1531, 1196, 1029 $cm^{-1}$. An HPLC of the product showed a single major peak, with no residual APMA or ethyl bromoacetate detected. The NMR and IR were consistent with the following structure:

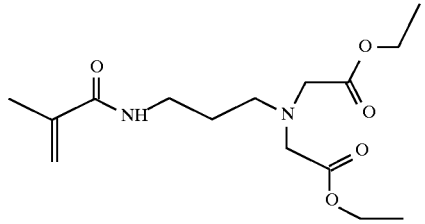

EXAMPLE 22

Lenses were made from a blend of 68.9 grams HEMA, 14.2 grams of polyethylene glycol-urethane dimethacrylate (made by reacting polyethylene glycol, 4500 MW with 2-isocyanatoethyl methacrylate), 9.49 grams of ethoxylated (10 mole) bisphenol A dimethacrylate, 1.89 grams of methacrylic acid, 5.07 grams of the product of Example 21, and 0.38 grams of DAROCUR 1173, 51.4 grams polyoxyalkylated bisphenol A (MW 670) and 51.4 grams ethoxylated (20 moles) methylglucoside. The lenses were heated in buffered saline in an autoclave at 121° C. for 7 hours. The diameter of the lenses before autoclaving was 13.3 mm. After heating the diameter increased to 13.9 mm and the water content increased to 62.5%.

Iron chelation testing followed the procedure described above, except that the lens was combined with 100 μl $Fe^{+2}$ solution and 900 μl water, then shaken 48 hours, after which the iron content of the resulting solution was analyzed. The lenses removed 92% of the iron from the solution.

EXAMPLE 23

Lenses were made from a blend of 65.4 grams HEMA, 13.5 grams of polyethylene glycol-urethane dimethacrylate (made by reacting polyethylene glycol, 4500 MW with 2-isocyanatoethyl methacrylate), 9.01 grams of ethoxylated (10 mole) bisphenol A dimethacrylate, 1.80 grams of methacrylic acid, 9.88 grams of the product of Example 21, and 0.36 grams of DAROCUR 1173, 48.8 grams polyoxyalkylated bisphenol A (MW 670) and 48.8 grams ethoxylated (20 moles) methylglucoside. The lenses were heated in buffered saline in an autoclave at 121° C. for 7 hours. The diameter of the lenses before autoclaving was 13.3 mm. After heating the diameter increased to 14.6 mm and the water content increased to 66.3%.

Iron chelation testing followed the procedure described above, except that the lens was combined with 100 $\mu$l $Fe^{+2}$ solution and 900 $\mu$l water, then shaken 48 hours, after which the iron content of the resulting solution was analyzed. The lenses removed 99% of the iron from the solution.

EXAMPLE 24

2.13 grams of aminopropylmethacrylamide, 2.51 grams triethylamine and 2.00 grams diethylenetriaminetetraacetic acid dianhydride were combined in 120 ml of anhydrous ethanol and refluxed for 7 hours. The solution was cooled, and 1M HCl in diethyl ether was added until it was acidic by pH paper. This solution was heated to reflux for 7.5 hours then cooled. 0.02 gram hydroquinone monomethyl ether was added and the solvent was evaporated to give an opaque oil. Saturated aqueous $NaHCO_3$ was added until the resulting solution was alkaline and the product was extracted three times into $CH_2Cl_2$. The $CH_2Cl_2$ was dried over $NaSO_4$ and evaporated to give 2.44 grams of oil.

EXAMPLE 25

Contact lenses were made by irradiating a blend of 0.92 grams of a boric acid ester of glycerin (0.16 moles boric acid per mole of glycerin) with 1.26 grams HEMA (containing 0.17% EGDMA), 0.84 grams of the crystalline product of EXAMPLE 1 and 0.02 gram DAROCUR 1173 with UV light in a polystyrene mold for 30 minutes. The molds were opened and the lenses were removed by immersing the molds in borate buffered saline. The hydrated lenses were heated for 7 hours at 122° C. Each resulting lens was then shaken for 48 hours in a solution of 300 $\mu$l of an 81 ppm $Fe^{+2}$ solution (0.400 gram of $FeSO_4 7H_2O$ and 1 ml $H_2SO_4$ diluted with water to one liter) and 700 $\mu$l water and then rinsed and stored in borate buffered saline. The UV spectra of these iron-treated lenses shows a substantial reduction in the UV transmittence as compared identical lenses which were not treated with iron (FIG. 1).

EXAMPLE 26

Contact lenses were made by irradiating a blend of 0.90 grams of a boric acid ester of glycerin (0.16 moles boric acid per mole of glycerin) with 1.68 grams HEMA (containing 0.17% EGDMA), 0.42 grams of the crystalline product of EXAMPLE 2 and 0.01 gram DAROCUR 1173 with UV light in a polystyrene mold for 30 minutes. The molds were opened and the lenses were removed by immersing the molds in borate buffered saline. The hydrated lenses were heated for 7 hours at 122° C. Each resulting lens was then shaken for 48 hours in a solution of 900 $\mu$l of the 81 ppm $Fe^{+2}$ solution from EXAMPLE 3 and 100 $\mu$l water and then rinsed and stored in borate buffered saline. The UV spectra of these iron-treated lenses shows a substantial reduction in the UV transmittance as compared to identical lenses which were not treated with iron (FIG. 2).

EXAMPLE 27

Contact lenses were made by irradiating a blend of 2.51 grams of a boric acid ester of glycerin (0.16 moles boric acid per mole of glycerin) with 2.17 grams HEMA (containing 0.17% EGDMA), 0.50 gram MAA, 0.021 gram EGDMA, 0.252 gram 2,3-dibromopropylmethacrylate and 0.025 gram DAROCUR 1173 ($\alpha$-hydroxy-$\alpha$,$\alpha$-dimethylacetophenone) with UV light in a polystyrene mold for 30 minutes. Each lens was removed from the mold and placed in a vial with 500 $\mu$l of diethylimino diacetate and 1000 $\mu$l glycerin and heated for 67 hours at 108° C. The resulting lenses were rinsed with ethanol and heated in borate buffered saline for 7 hours at 121° C. Each lens was then immersed in a solution of 300 $\mu$l of the 81 ppm solution of $Fe^{+2}$ from EXAMPLE 3 and 700 ml water and was shaken for 48 hours, and then rinsed and soaked in borate buffered saline. The UV spectra of the resulting lenses shows a substantial reduction in the amount of UV transmittance as compared to identical lenses which had not been treated with iron (FIG. 3).

EXAMPLE 28

A lens from Example 15 was immersed in a 1% solution of copper (II) acetate for 10 minutes and then transferred to a buffered saline solution. The lens had a nice light blue tint that made it easier to see.

What is claimed is:

1. A soft contact lens which comprises a water-swollen gel of a polymer prepared by polymerizing one or more hydrophilic monomers, one or more cross-linking monomers, and a monomer which contributes or which can, after completion of lens polymerization, be developed to contribute, metal-chelating functionality, wherein the monomer that contributes metal-chelating functionality is selected from the group consisting of methacrylic acid amides containing an alkylamino-N,N-diacetic acid group, and acrylic acid amides containing an alkylamino-N,N-diacetic acid group.

2. A soft contact lens which comprises a water-swollen gel of a polymer prepared by polymerizing one or more hydrophilic monomers, one or more cross-linking monomers, and a monomer which contributes or which can, after completion of lens polymerization, be developed to contribute, metal-chelating functionality, wherein the monomer that contributes metal-chelating functionality is selected from the group consisting of methacrylic acid amides containing an allylamino-N,N-diester group, and acrylic acid amides containing an alkylamino-N,N-diester group.

3. A soft contact lens which comprises a water-swollen gel of a polymer prepared by polymerizing one or more hydrophilic monomers, one or more cross-linking monomers, and a monomer which contributes or which can, after completion of lens polymerization, be developed to contribute, metal-chelating functionality, wherein the monomer that contributes metal-chelating functionality is an ester of aminopropylmethacrylamide-N,N-diacetic acid.

4. A soft contact lens which comprises a water-swollen gel of a polymer prepared by polymerizing one or more hydrophilic monomers, one or more cross-linking monomers, and a monomer which contributes or which can, after completion of lens polymerization, be developed to contribute, metal-chelating functionality, wherein the monomer that contributes metal-chelating functionality is an aminopropylmethacrylamide-N,N-diacetic acid diethyl ester.

5. The soft contact lens of claim 2 to which iron has been added.

6. The soft contact lens of claim 3, to which iron has been added.

7. The soft contact lens of claim 4, to which iron has been added.

8. The soft contact lens of claim 1 to which copper has been added in an amount sufficient to add enough color to the lens to render it visible in normal contact lens storage or cleaning fluids without resulting in an unacceptable loss of lens clarity.

9. The soft contact lens of claim 3, to which copper has been added in an amount sufficient to add enough color to the lens to render it visible in normal contact lens storage or cleaning fluids without resulting in an unacceptable loss of lens clarity.

10. The soft contact lens of claim 4, to which copper has been added in an amount sufficient to add enough color to the lens to render it visible in normal contact lens storage or cleaning fluids without resulting in an unacceptable loss of lens clarity.

11. The contact lens according to claim 1, wherein said monomer that contributes metal-chelating functionality is selected from the group consisting of methacrylic acid amides containing an alkylamino-N,N-diacetic acid group.

12. The contact lens according to claim 1, wherein said monomer that contributes metal-chelating functionality is selected from the group consisting of acrylic acid amides containing an alkylamino-N,N-diacetic acid group.

13. The contact lens according to claim 2, wherein said monomer that contributes metal-chelating functionality is selected from the group consisting of methacrylic acid amides containing an alkylamino-N,N-diester group.

14. The contact lens according to claim 2, wherein said monomer that contributes metal-chelating functionality is selected from the group consisting of acrylic acid amides containing an alkylamino-N,N-diester group.

15. The soft contact lens of claim 1 to which iron has been added.

16. The soft contact lens of claim 2 to which copper has been added in an amount sufficient to add enough color to the lens to render it visible in normal contact lens storage or cleaning fluids without resulting in an unacceptable loss of lens clarity.

* * * * *